R. F. CHANNELL & A. BONZANO.
Photographic Plate-Holder.
No. 8,359. Reissued Aug. 6, 1878.
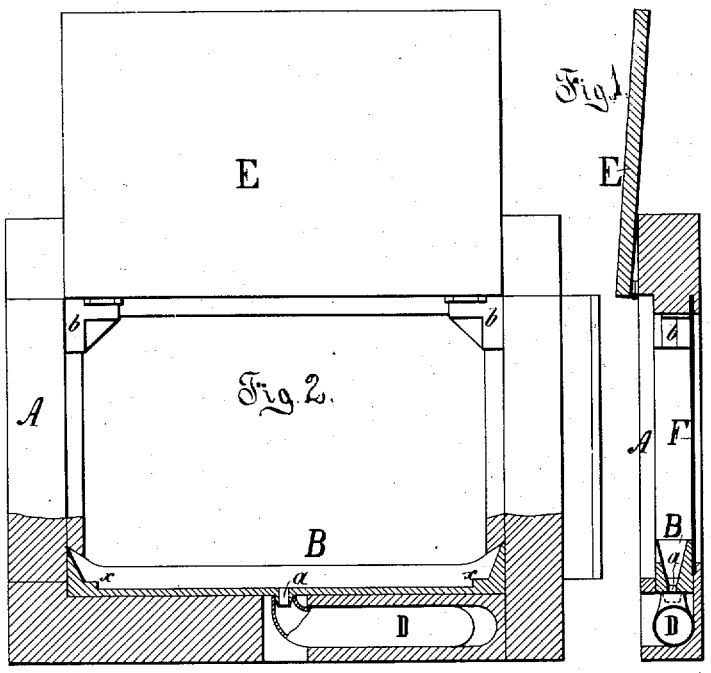
Witnesses:
Theodore L. Foster
B. S. Clark
Inventors:
Ralph F. Channell
Adolphus Bonzano
By J. Dick
Their Atty.

UNITED STATES PATENT OFFICE.

RALPH F. CHANNELL AND ADOLPHUS BONZANO, OF PHŒNIXVILLE, PA.

IMPROVEMENT IN PHOTOGRAPHIC-PLATE HOLDERS.

Specification forming part of Letters Patent No. 132,250, dated October 15, 1872; Reissue No. 8,359, dated August 6, 1878; application filed May 22, 1878.

*To all whom it may concern:*

Be it known that we, RALPH F. CHANNELL and ADOLPHUS BONZANO, of Phœnixville, Chester county, Pennsylvania, have invented an Improvement in Photographic-Plate Holders, of which the following is a specification, reference being had to the accompanying drawings, forming part of the same.

Figure 1 is a cross vertical section of a plate-holder and trough embodying our invention; and Fig. 2 is a longitudinal vertical section of the same.

The object of our invention is twofold: first, to save the chemicals employed in connection with photographic negatives; and, second, to prevent the rapid destruction of the wooden frames by the action of the chemicals. We attain these objects by combining with the usual plate-holder A, illustrated in the accompanying drawing, a detachable and removable trough, B, of glass, earthenware, or other material that will not be acted upon by the chemicals for receiving the lower edge of the glass negative.

The frame is of the ordinary construction, having the usual flap E, dark side F, and may have the usual corner-pieces *b b*, for receiving the two upper corners of the glass negative. The usual lower corner-pieces are discarded, to make way for the introduction and ready removal of the trough B, the same being made to fit into the bottom of the frame, so as to be readily placed in the frame and removed therefrom. Near the ends of the trough projections or ledges *x* may be arranged to receive the lower corners of the negative, from which the chemicals drip into the trough, so that they are entirely free from contact with the wood of the frame, the latter being protected by the trough from their deteriorating action.

The trough is preferably provided with an outlet, *a*, at the bottom, which may consist of a short pipe entering the mouth of a glass reservoir, D, which can be withdrawn from the frame from time to time and emptied of its contents. When this outlet is not provided, the trough itself may be in like manner removed and emptied and readily replaced.

What we claim as our invention, and desire to secure by Letters Patent, is—

1. The combination, with the frame A, of the trough B, made detachable and removable from said frame, substantially as and for the purpose described.

2. The combination, with the frame and reservoir, of the trough B, arranged to serve as a rest for the plate, and communicating with the reservoir, substantially as and for the purpose described.

3. The trough B, adapted to the frame and having ledges *x* at the ends, for the purpose set forth.

In testimony whereof we have subscribed our names to this specification this 16th day of May, 1878.

RALPH F. CHANNELL.
ADOLPHUS BONZANO.

Witnesses:
S. D. HUNTER,
JEROME JOHNS.